United States Patent
Goyal et al.

(10) Patent No.: US 6,650,812 B2
(45) Date of Patent: Nov. 18, 2003

(54) SMALL RESIDUAL DISPERSION FIBER CONNECTED WITH A DISPERSION COMPENSATING FIBER

(75) Inventors: Ishwar Chandra Goyal, New Delhi (IN); Ravendra Kumar Varshney, New Delhi (IN); Bishnu Pal, New Delhi (IN); Ajoy Ghatak, New Delhi (IN)

(73) Assignee: Renka Corporation, Peabody, MA (US)

( * ) Notice: Subject to any disclaimer, the term of this patent is extended or adjusted under 35 U.S.C. 154(b) by 78 days.

(21) Appl. No.: 09/844,713

(22) Filed: Apr. 27, 2001

(65) Prior Publication Data

US 2003/0007760 A1 Jan. 9, 2003

(51) Int. Cl.$^7$ ................................................. G02B 6/02
(52) U.S. Cl. ........................ 385/123; 385/124; 385/126
(58) Field of Search .................................. 385/123–127

(56) References Cited

U.S. PATENT DOCUMENTS

| | | | | |
|---|---|---|---|---|
| 5,559,921 A | * | 9/1996 | Terasawa et al. | 385/124 |
| 5,673,354 A | | 9/1997 | Akasaka et al. | 385/127 |
| 6,031,955 A | | 2/2000 | Mukasa et al. | 385/123 |
| 6,178,279 B1 | * | 1/2001 | Mukasa et al. | 385/123 |
| 6,366,728 B1 | * | 4/2002 | Way et al. | 385/123 |
| 6,430,347 B1 | * | 8/2002 | Cain et al. | 385/123 |

OTHER PUBLICATIONS

Akasaka, Y., et al., "Dispersion Flat Compensation Fiber For Dispersion Shifted Fiber," 22nd Eurpoean Conference on Optical Communication, ECOC '96 Oslo, 221–224.

Gnauck, A.H., et al., "Dispersion and Dispersion–slope compensation of NZDSF for 40–Gb/s Operation Over the Entire C Band," Trends in Optics and Photonics 37(4):190–192 (2000).

Tsuda, T., et al., "Broad Band Dispersion Slope Compensation of Dispersion Shifted Fiber Using Negative Slope Fiber," ECOC '98 Madrid:233–234, (1998).

Sakamoto, T. et al., "Wide wavelength band (1535–1560nm and 1574–1600nm), 28×10 Gbit/s WDM transmission over 320 km dispersion–shifted fibre," *Electronics Letters* 34(4):392–394 (1998).

Tkach, R.W. et al., "Four–Photon Mixing and High–Speed WDM Systems," *J. Lightwave Tech.* 13(5):841–849 (1995.

Yoshida, Seiji et al., "10 Gbit/s x 10–channel WDM transmission experiment over 1200km with repeater spacing of 100km without gain equalization or pre–emphasis," *OFC '96 Technical Digest*:pp. 19–21.

Adams, M. J., "An Introduction to Optical Waveguides," (John Wiley & Sons Ltd.), pp. 244–245 (1981).

Chraplyvy, Andrew R., "Limitations on Lightwave Communications Imposed by Optical–Fiber Nonlinearities," *J. Lightwave Tech.* 8(10): 1548–1557 (1990).

Ghatak, Ajoy et al., "Fiber Optica," A Software for Characterizing Fiber and Integrated–Optic Waveguides (Viva Books Private Limited) (1999).

* cited by examiner

*Primary Examiner*—Robert H. Kim
*Assistant Examiner*—Theresa Barber
(74) *Attorney, Agent, or Firm*—Hamilton, Brook, Smith & Reynolds, P.C.

(57) ABSTRACT

An optical fiber link having a small residual dispersion fiber (SRDF) connected to a dispersion compensating fiber (DCF). The SRDF has a positive dispersion slope, and the DCF has a negative dispersion slope. The dispersion slope of the DCF is matched to the dispersion slope of the SRDF so that the DCF compensates the accumulated dispersion in the SRDF in the wavelength range between about 1530 nm to 1565 nm which represents the C-band of erbium doped fiber amplifiers (EDFA).

30 Claims, 4 Drawing Sheets

SMALL RESIDUAL DISPERSION FIBER CONNECTED WITH A DISPERSION COMPENSATING FIBER

BACKGROUND

Many optical communication systems use dense wavelength division multiplexing (DWDM) in the wavelength region 1530–1565 nm, which represents the C-band gain window of erbium doped fiber amplifiers (EDFA). Because of the high optical gain of EDFA, when signals are transmitted simultaneously at closely spaced wavelengths, non-linear effects such as Four Wave Mixing (FWM) arise in these systems which impose serious limitations, especially when operated very close to the zero dispersion wavelength (ZDW). To overcome this difficulty, some communication systems use small dispersion fibers that have dispersions typically in the range of 2–8 ps/(km.nm). When using fibers with such dispersions, the phase matching condition is not satisfied and hence the effect of FWM could be greatly reduced.

Thus, by implementing DWDM in a small dispersion fiber and using EDFA and distributed feed-back (DFB) laser diodes as light sources, a very high bit rate over a few hundred kilometers can be obtained without using a repeater. However, if repeaterless transmission of signals over very large distances (e.g., greater than 1000 km) is desired, the residual dispersion (2–8 ps/(km.nm)) in these fibers will continue to accumulate and therefore will limit the number of bits that can be sent at each wavelength.

SUMMARY

The present invention greatly reduces some of the difficulties encountered in the aforementioned optical communications systems. In particular, the present invention implements an optical fiber link including a small residual dispersion fiber (SRDF) connected to a dispersion compensating fiber (DCF). The dispersion slope of the SRDF is positive and that of the DCF is negative. The dispersion slope of the DCF is appropriately tailored to the dispersion slope of the SRDF so that the DCF compensates for the accumulated dispersion in the SRDF for all wavelengths spanning the entire C-band of an EDFA.

The DCF compensates the accumulated dispersion in the SRDF for wavelengths in the range 1530 nm to 1565 nm. The effective dispersion resulting from the combination of the DCF and the SRDF is less than about 0.08 ps/(km.nm), and the slope of the effective dispersion is less than about 0.016 ps/(km.nm$^2$).

The SRDF typically includes an inner core layer, an outer core layer positioned coaxially with and formed on the outside of the inner core layer, and a cladding layer positioned coaxially with and formed on the outside of the outer core layer. In one embodiment, the inner core layer has a radius of about 2 $\mu$m and an index of refraction of about 1.46017 at a wavelength of about 1550 nm. The outer core layer has an inner radius equal to the outer radius of the inner core layer and an outer radius of about 3.7 $\mu$m, and an index of refraction of about 1.45057 at a wavelength of about 1550 nm. The outer cladding layer has an inner radius equal to the outer radius of the outer core layer, and an index of refraction of about 1.44402 at a wavelength of about 1550 nm.

In certain embodiments, the inner core layer, the outer core layer, and the cladding layer of the SRDF are made from SiO$_2$ (silica). The inner core layer is doped with GeO$_2$ having a mole fraction of about 10.3%, and the outer core layer is also doped with GeO$_2$ with a mole fraction of about 4.3%. As such, the relative index of refraction difference between the inner core layer and the cladding layer is about 0.011, and the relative index of refraction difference between the outer core layer and the cladding layer is about 0.0045 so that the dispersion of the SRDF varies from about 6 ps/(km.nm) to about 8 ps/(km.nm) in the C-band.

In these embodiments as well as others, the DCF typically includes an inner core layer, an inner cladding layer positioned coaxially with and formed on the outside of the inner core layer, an outer core layer positioned coaxially with and formed on the outside of the inner cladding layer, and an outer cladding layer positioned coaxially with the outer core layer and formed on the outside of that layer. In one embodiment, the inner core layer has a radius of about 1.1 $\mu$m and an index of refraction of about 1.47380 at a wavelength of about 1550 nm. The inner cladding layer has an inner radius corresponding to the outer radius of the inner core layer and an outer radius of about 5.33 $\mu$m, and an index of refraction of about 1.43828 at a wavelength of about 1550 nm. The outer core layer has an inner radius equal to the outer radius of the inner cladding layer and an outer radius of about 7.7 $\mu$m, and an index of refraction of about 1.44838 at a wavelength of about 1550 nm. The outer cladding layer has an inner radius equal to the outer radius of the outer core layer, and an index of refraction of about 1.44402 at a wavelength of about 1550 nm.

In some embodiments of the DCF, the inner core layer, the inner cladding layer, the outer core layer, and the outer cladding layer are all made from SiO$_2$. The inner core layer and the outer core layer are doped with GeO$_2$. The mole fraction of the GeO$_2$ in the inner core layer and the outer core layer is about 18.4%, and about 2.9%, respectively. The inner cladding layer is doped with fluorine with a mole fraction of about 1.26%. For a DCF made with these materials, the relative index of refraction difference between the inner core layer and the outer cladding layer is about 0.02, the relative index of refraction difference between the inner cladding layer and the outer cladding layer is about −0.004, and the relative index of refraction difference between the outer core layer and the outer cladding layer is about 0.003 so that the dispersion of the DCF varies from about −220 ps/(km.nm) to about −300 ps/(km.nm) in the C-band.

In particular embodiments of this aspect, the length of the SRDF is about 37 times the length of the DCF. Related aspects of the invention include the DCF itself which can be connected to the SRDF, a method of making the optical fiber link, and a method of using the fiber link to compensate for accumulated dispersion in the SRDF.

Among other advantages, the maximum value of the effective dispersion, DE, of the fiber link is sufficiently small so that an optical system, which implements the present invention, can use erbium doped fiber amplifiers (EDFA) and DFB laser diodes as the light sources to provide repeaterless transmission of signals simultaneously over several wavelengths for distances greater than 1000 km. Still further aspects, features, and advantages follow.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
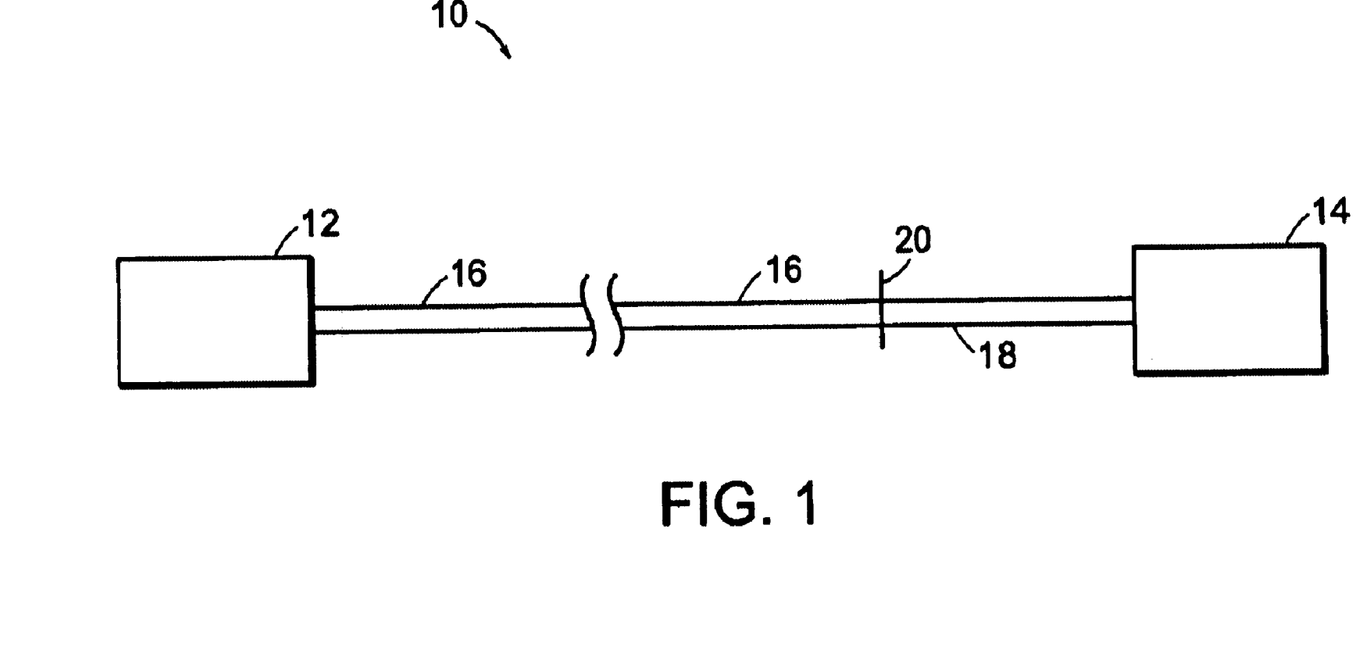
FIG. 1 is a schematic view illustrating an optical network system in which the accumulated dispersion of a small residual dispersion fiber (SRDF) is compensated for by connecting the SRDF to a dispersion compensating fiber (DCF) in accordance with the present invention.

A description of preferred embodiments of the invention follows. Turning to FIG. 1, there is shown an optical system network 10 for transmitting signals from a transmitter 12 to a receiving station 14. The transmitter 12 is coupled to a small residual dispersion fiber (SRDF) 16, and the receiving station 14 is connected to a dispersion compensating fiber (DCF) 18. The DCF 18 and the SRDF 16 are joined together at a junction 20.

In the present invention, the SRDF 16 accumulates dispersion with a positive dispersion slope, that is, the dispersion in the SRDF 16 increases with increasing wavelengths. The dispersion in the DCF 18, on the other hand, decreases with increasing wavelengths because the DCF 18 has a negative dispersion slope. The negative dispersion slope of the DCF 18 is matched to the positive dispersion slope of the SRDF 16 so that a small length of the DCF 18 can compensate for the accumulated dispersion in the SRDF 16 simultaneously over all wavelengths in the range of about 1530 nm to 1565 nm. The maximum values of the effective dispersion and the slope of the effective dispersion in this wavelength range is about 0.08 ps/(km.nm) and about 0.016 ps/(km.nm$^2$), respectively.

In use, the transmitter sends signals through the SRDF 16. Over large distances, the residual dispersion in the SRDF 16 continues to accumulate, and as noted above, the dispersion in the SRDF 16 has a positive dispersion slope (increasing dispersion with increasing wavelengths). On the other hand, the DCF 18 has a negative dispersion slope (decreasing dispersion with increasing wavelengths). Therefore, by connecting the DCF 18 to the SRDF 16 and matching the negative dispersion slope of the DCF 18 to the positive dispersion slope of the SRDF 16, the DCF reduces the accumulated dispersion in the SRDF to the extent that the receiving station 14 receives optical signals with a very small effective dispersion. Because the dispersion that accumulates in the SRDF 16 has been effectively reduced before the signals are received by the receiving station 14, the optical system network 10 is able to transmit signals at very high bit rates over large distances without employing a repeater.

Figure 2:
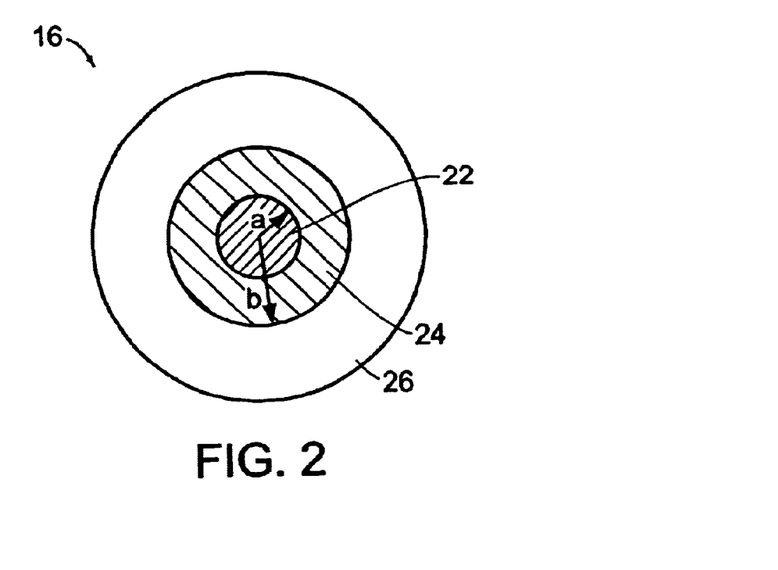
FIG. 2 is a cross-sectional view of the SRDF.

As shown in FIG. 2, the SRDF 16 is typically formed of an inner core layer 22 having a radius "a", an outer core layer 24 having a radius "b" positioned about or encircling the outside of and in contact with the inner core layer 22, and a cladding layer 26 positioned about or encircling the outside of and in contact with the outer core layer 24. Typically, the inner core layer 22 has a cylindrical shape, and the outer core layer 24 and the cladding layer have an annular shape. The index of refractions for the inner core layer 22, the outer core layer 24, and the cladding layer 26 are identified as $n_{1S}$, $n_{3S}$, and $n_{2S}$, respectively. The ratio b/a of the outer radius of the outer core layer 24 and the radius of the inner core layer 22 is typically about 1.85, and the index of refractions $n_{1S}$, $n_{3S}$, and $n_{2S}$ satisfy the condition $n_{1S} > n_{3S} > n_{2S}$. Further, if $\Delta_{1S}$ is the relative index of refraction difference between the inner core layer 22 and the cladding layer 26, and $\Delta_{3S}$ is the relative index of refraction difference between the outer core layer 24 and the cladding layer 26, the following two conditions are also satisfied:

$$\Delta_{1S} = (n_{1S}^2 - n_{2S}^2)/2n_{1S}^2 = 0.011 \quad\quad (\text{Eq. 1})$$

and $$\Delta_{3S} = (n_{3S}^2 - n_{2S}^2)/2n_{3S}^2 = 0.0045 \quad\quad (\text{Eq. 2})$$

Figure 3:
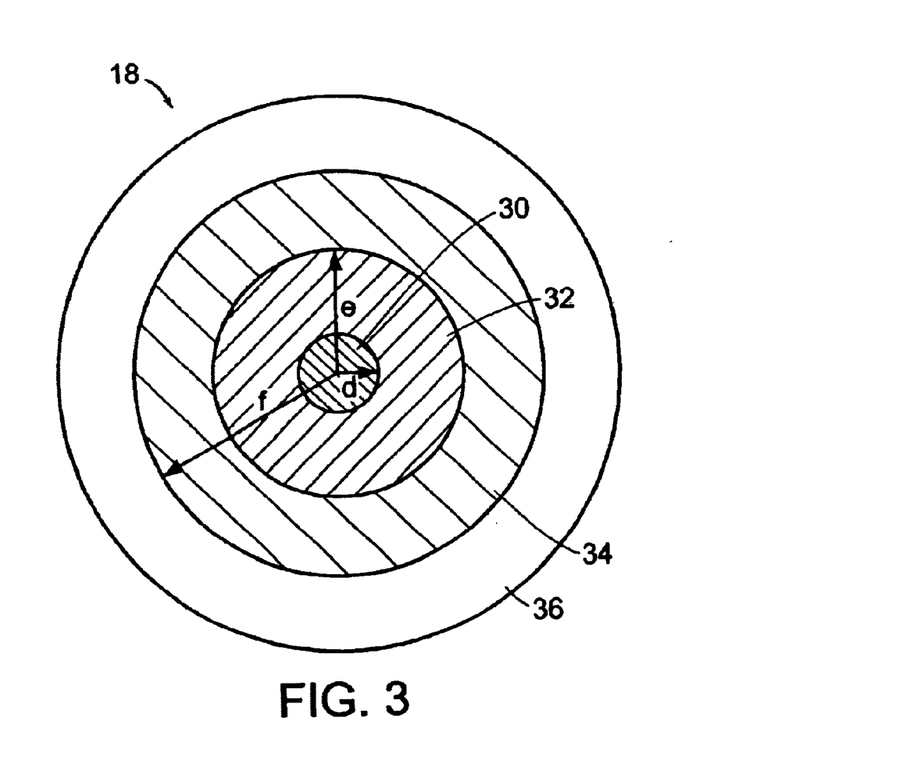
FIG. 3 is a cross-sectional view of the DCF.

Referring now to FIG. 3, the DCF 18 is typically formed of an inner core layer 30 having a radius "d", an inner cladding layer 32 having a radius "e" positioned about or encircling and in contact with the inner core layer 30, an outer core layer 34 having a radius "f" positioned about or encircling and in contact with the inner cladding layer 32, and an outer cladding layer 36 positioned about or encircling and in contact with the outer core layer 34. In the present embodiment, the inner core layer 30 has a cylindrical shape, and the inner cladding layer 32, the outer core layer 34, and the outer cladding layer 36 have an annular shape. The ratio e/d of the outer radius of the inner cladding layer 32 to the radius of the inner core layer 30 is typically about 4.845, and the ratio f/e of the outer radius of the outer core layer 34 to the outer radius of the inner cladding layer 32 is typically about 1.45. The index of refractions of the inner core layer 30, the inner cladding layer 32, the outer core layer 34, and the outer cladding layer 36 are identified, respectively, by the terms $n_{1C}$, $n_{3C}$, $n_{4C}$, and $n_{2C}$, which satisfy the condition $n_{1C} > n_{4C} > n_{2C} > n_{3C}$. The index of refractions for the DCF also satisfy the following three conditions:

$$\Delta_{1C} = (n_{1C}^2 - n_{2C}^2)/2n_{1C}^2 = 0.02 \quad\quad (\text{Eq. 3})$$

$$\Delta_{3C} = (n_{3C}^2 - n_{2C}^2)/2n_{3C}^2 = -0.004 \quad\quad (\text{Eq. 4})$$

and $$\Delta_{4C} = (n_{4C}^2 - n_{2C}^2)/2n_{4C}^2 = 0.003 \quad\quad (\text{Eq. 5})$$

where $\Delta_{1C}$ is the relative index of refraction difference between the inner core layer 30 and the outer cladding layer 36, $\Delta_{3C}$ is the relative index of refraction difference between the inner cladding layer 32 and the outer cladding layer 36, and $\Delta_{4C}$ is the relative index of refraction difference between the outer core layer 34 and the outer cladding layer 36.

The dispersion characteristics of an embodiment of the present invention were determined for the SRDF with the following characteristics: the inner core layer 22, the outer core layer 24, and the cladding layer 26 of the SRDF 16 are each made from SiO$_2$, (silica). The inner core layer 22, and the outer core layer 24 are also doped with GeO$_2$. The mole fractions of GeO$_2$ in the inner core layer 22 and in the outer core layer 24 are 10.3% and 4.3%, respectively. The index of refractions, at a wavelength of 1550 nm, for the inner core layer 22, the outer core layer 24, and the cladding layer 26 are $n_{1S}$=1.46017, $n_{3S}$=1.45057, and $n_{2S}$=1.44402, respectively. The refractive index profile of the SRDF 16 (FIG. 2) is shown as a solid line in the insert of FIG. 4, and the values of the parameters for the SRDF 16 are shown in Table 1.

TABLE 1

Figure 4:
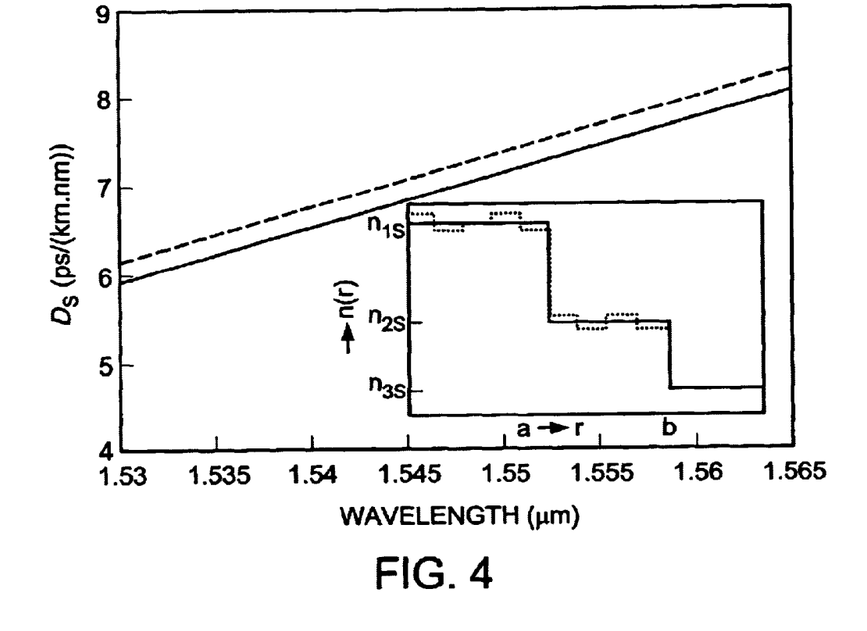
FIG. 4 is a graph showing the total dispersion, $D_S$, of the SRDF as a function of wavelength, with an insert illustrating the refractive index profile of the SRDF.

Parameters for the SRDF whose refractive index profile is shown by the solid lines in the insert of FIG. 4.

| $\Delta_{1S}$ (%) | $\Delta_{3S}$ (%) | a ($\mu$m) | b ($\mu$m) |
|---|---|---|---|
| 1.1 | 0.45 | 2.0 | 3.7 | where $\Delta_{1S}$ and $\Delta_{3S}$ are calculated from Eqns. 1 and 2, respectively.

As for the DCF 18, the inner core layer 30, the inner cladding layer 32, the outer core layer 34, and the outer cladding layer 36 of the DCF 18 are also all made from $SiO_2$. The inner core layer 30 and the outer core layer 34 are doped with $GeO_2$, and the inner cladding layer 32 is doped with fluorine. The mole fractions of the $GeO_2$ in the inner core layer 30 and the outer core layer 34 are 18.4% and 2.9%, respectively, while the mole fraction of fluorine in the inner cladding layer 32 is about 1.26%. The index of refractions, at a wavelength of 1550 nm, for the inner core layer 30, the inner cladding layer 32, the outer core layer 34, and the outer cladding layer 36 are $n_{1C}$=1.47380, $n_{3C}$=1.43828, $n_{4C}$=1.44838, and $n_{2C}$=1.44402, respectively. The refractive index profile for the DCF 18 (FIG. 3) is shown in the insert of FIG. 5, and the corresponding values of the parameters for the DCF 18 are shown in Table 2.

TABLE 2

Figure 5:
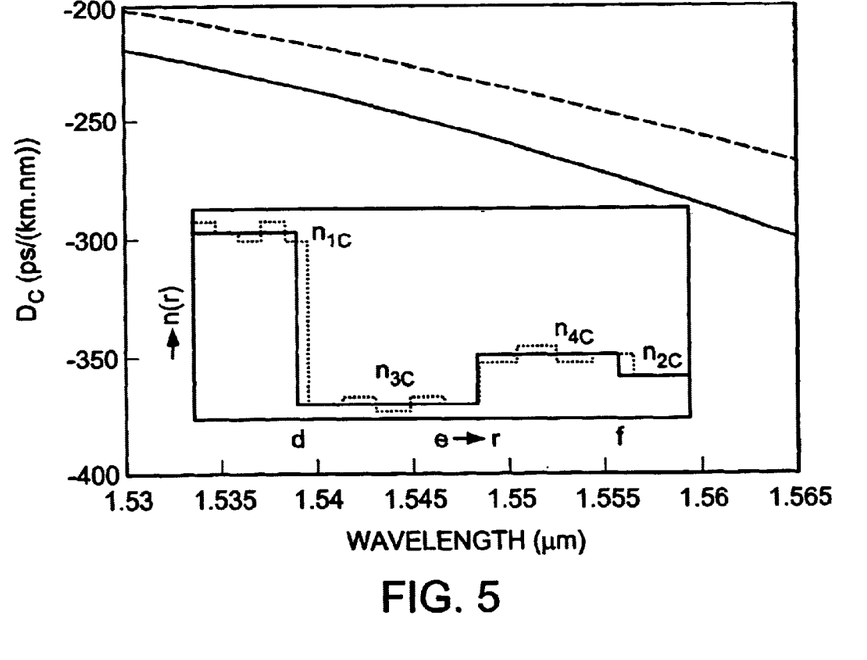
FIG. 5 is a graph showing the total dispersion, $D_C$, of the DCF as a function of wavelength, with an insert illustrating the refractive index profile of the DCF.

Parameters for the DCF whose refractive index profile is shown by the solid lines in the insert of FIG. 5.

| $\Delta_{1C}$ (%) | $\Delta_{3C}$ (%) | $\Delta_{4C}$ (%) | d ($\mu$m) | e ($\mu$m) | f ($\mu$m) |
|---|---|---|---|---|---|
| 2.0 | −0.4 | 0.3 | 1.1 | 5.33 | 7.7 | where $A_{1C}$, $A_{3C}$, and $A_{4C}$ are calculated from Eqns. 3, 4, and 5, respectively.

The spectral response of the dispersion of the SRDF 16 is illustrated in FIG. 4, and the dispersion characteristics of the DCF 18 is shown in FIG. 5. Each of FIGS. 4 and 5 illustrate the variation of the total dispersion of the respective fiber as a function of the wavelength (solid lines). The tolerance of the dispersion characteristics of the SRDF 16 and the DCF 18 were evaluated by perturbing (or varying) the values of the relative index of refraction differences and the radii of various regions of the fibers by about 1%. These perturbed refractive index profiles are shown in the inserts of FIGS. 4 and 5 as dashed lines, while the solid lines represent the calculated profiles. The variation of the dispersion characteristics of the fibers corresponding to the perturbed refractive index profiles is shown by the dashed curves in FIGS. 4 and 5, respectively, for the SRDF 16 and the DCF 18.

As can be seen in FIGS. 4 and 5, the total dispersion of the SRDF 16, $D_S$, varies between about 6–8 ps/(km.nm) in the wavelength range of 1530 nm to 1565 $\mu$m, and the total dispersion of the DCF 18, $D_C$, varies between about −220 to −300 ps/(km.nm) in the same wavelength range.

Note that the negative slope of the dispersion curve for the DCF 18 is matched to the positive slope of the dispersion curve of the SRDF 16 in a way such that the dispersion in the DCF 18 over the wavelengths between about 1530 nm to 1565 nm effectively cancels the accumulated dispersion in the SRDF over the same wavelength range. As such, the effective dispersion, $D_E$, of the combination of the DCF 18 with the SRDF 16 is very small.

Figure 6:
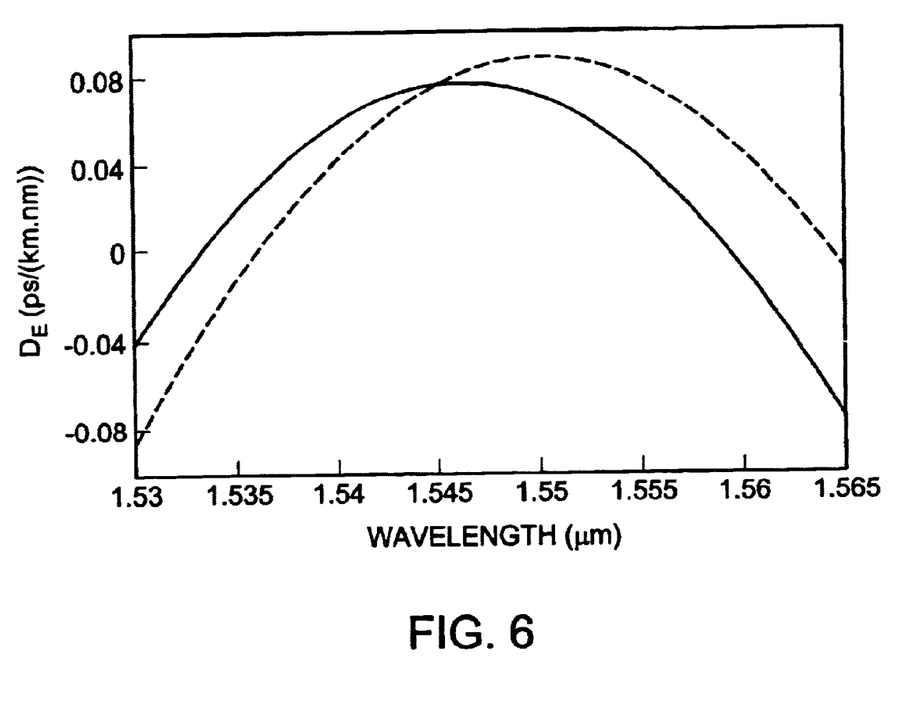
FIG. 6 is a graph showing the variation of the effective dispersion, $D_E$, of the system as a function of wavelength.

Referring now to FIG. 6, there is shown the effective dispersion, $D_E$, of the optical system 10 as a function of the wavelength, where $D_E$ is represented by the expression $$D_E=(L_1D_S+L_2D_C)/(L_1+L_2) \tag{Eq. 6}$$

and where $L_1$ is the length of the SRDF 16 (FIG. 2) and $L_2$ is the length of the DCF 18 (FIG. 3). Again, the solid and dashed curves in FIG. 6 are the effective dispersion characteristics of the fibers corresponding to the calculated and the perturbed refractive index profiles (shown schematically in the inserts of FIGS. 4 and 5), respectively. The optimum ratio of the lengths of the fibers is $L_1 \approx 37\, L_2$ for the calculated case (solid line), while the perturbed case (dashed line) corresponds to a ratio of $L_1 \approx 32\, L_2$. As is readily apparent, the 1% variation in the values of the relative index of refraction differences and the radii of the various regions does not appreciably change the effective dispersion, $D_E$, of the optical link That is, the maximum value of the effective dispersion, $D_E$, is about the same for both the calculated and the perturbed cases.

As can be seen in FIG. 6, the maximum value of the effective dispersion, $D_E$, is less than about 0.08 ps/(km.nm), and the slope of the effective dispersion is about 0.016 ps/(km.nm$^2$) in the wavelength range of 1530 to 1565 nm. As such, the value of the maximum DE is sufficiently small so that the optical system of the present invention can use erbium doped fiber amplifiers (EDFA) and DFB laser diodes as the light sources to provide repeaterless transmission over lengths greater than 1000 km, simultaneously over many wavelengths.

While this invention has been particularly shown and described with references to preferred embodiments thereof, it will be understood by those skilled in the art that various changes in form and details may be made therein without departing from the scope of the invention encompassed by the appended claims. For example, other dopants such as $P_2O_5$, $B_2O_3$ can be used as refractive index modifiers. In addition, the invention is not limited to the physical dimensions and index of refractions specifically stated for the DCF 18 and the SRDF 16. That is, the DCF 18 and the SRDF 16 may be produced with other dimensions and index of refractions which would satisfy the aforementioned conditions.

What is claimed is:

1. An optical fiber link comprising:
   an optical fiber having a positive dispersion slope; and
   a dispersion compensating fiber (DCF) connected with the optical fiber and having a negative dispersion slope, the dispersion slope of the DCF being matched to the dispersion slope of the optical fiber in such a manner that the DCF compensates for the accumulated dispersion in the optical fiber, the DCF including an inner core layer, an inner cladding layer positioned coaxially with and formed on the outside of the inner core layer, an outer core layer positioned coaxially with and formed on the outside of the inner cladding layer, and an outer cladding layer positioned coaxially with and formed on the outside of the outer core layer.

2. The optical fiber link of claim 1, wherein the inner core layer has a radius of about 1.1 $\mu$m and an index of refraction of about 1.47380.

3. The optical fiber link of claim 1, wherein the inner cladding layer has an inner radius equal to the outer radius of the inner core layer and an outer radius of about 5.33 $\mu$m, and an index of refraction of about 1.43828.

4. The optical fiber link of claim 1, wherein the outer core layer has an inner radius equal to the outer radius of the inner cladding layer and an outer radius of about 7.7 μm, and an index of refraction of about 1.44838.

5. The optical fiber link of claim 1, wherein the outer cladding layer has an inner radius equal to the outer radius of the outer core layer, and an index of refraction of about 1.44402.

6. The optical fiber link of claim 1, wherein the inner core layer, the inner cladding layer, the outer core layer, and the outer cladding layer are each made from $SiO_2$.

7. The optical fiber link of claim 6, wherein the inner cladding layer is doped with fluorine having a mole fraction of about 1.26%.

8. The optical fiber link of claim 6, wherein the outer core layer is doped with $GeO_2$ having a mole fraction of about 2.9%.

9. The optical fiber link of claim 6, wherein the inner core layer is doped with $GeO_2$ having a mole fraction of about 18.4%.

10. The optical fiber link of claim 1, wherein the inner core layer has an index of refraction of $n_{1C}$, the inner cladding layer has an index of refraction of $n_{3C}$, the outer core layer has an index of refraction of $n_{4C}$, and the outer cladding layer has an index of refraction of $n_2$, such that the relative index of refraction difference, expressed as $\Delta_{1C}=(n_{1C}^2-n_{2C}^2)/2n_{1C}^2$, between the inner core layer and the outer cladding layer is about 0.02, the relative index of refraction difference, expressed as $\Delta_{3C}=(n_{3C}^2-n_{2C}^2)/2n_{3C}^2$, between the inner cladding layer and the outer cladding layer is about −0.004, and the relative index of refraction difference, expressed as $\Delta_{4C}=(n_{4C}^2-n_{2C}^2)/2n_{4C}^2$, between the outer core layer and the outer cladding layer is about 0.003.

11. An optical fiber link comprising:
an optical fiber having a positive dispersion slope and including an inner core layer having a radius of about 2 μm and an index of refract on of about 1.46, an outer core layer positioned coaxially with and formed on the outside of the inner core layer, and a cladding layer positioned coaxially with and formed on the outside of the outer core layer; and
a dispersion compensating fiber (DCF) connected with the optical fiber and having a negative dispersion slope, the dispersion slope of the DCF being matched to the dispersion slope of the optical fiber in such a manner that the DCF compensates for the accumulated dispersion in the optical fiber.

12. An optical fiber link comprising:
an optical fiber having a positive dispersion slope and including an inner core layer, an outer core layer having a radius of about 3.7 μm and an index of refraction of about 1.45 and being positioned coaxially with and formed on the outside of the inner core layer, and a cladding layer positioned coaxially with and formed on the outside of the outer core layer; and
a dispersion compensating fiber (DCF) connected with the optical fiber and having a negative dispersion slope, the dispersion slope of the DCF being matched to the dispersion slope of the optical fiber in such a manner that the DCF compensates for the accumulated dispersion in the optical fiber.

13. An optical fiber link comprising:
an optical fiber having a positive dispersion slope and including an inner core layer, an outer core layer positioned coaxially with and formed on the outside of the inner core layer, and a cladding layer having an inner radius corresponding to the outer radius of the outer core layer and an index of refraction of about 1.44 and being positioned coaxially with and formed on the outside of the outer core layer; and
a dispersion compensating fiber (DCF) connected with the optical fiber and having a negative dispersion slope, the dispersion slope of the DCF being matched to the dispersion slope of the optical fiber in such a manner that the DCF compensates for the accumulated dispersion in the optical fiber.

14. An optical fiber link comprising:
an optical fiber having a positive dispersion slope and including an inner core layer, an outer core layer positioned coaxially with and formed on the outside of the inner core layer, and a cladding layer positioned coaxially with and formed on the outside of the outer core layer, the inner core layer having an index of refraction of $n_{1S}$, the outer core layer having an index of refraction of $n_{3S}$, and the cladding layer having an index of refraction of $n_{2S}$, such that the relative index of refraction difference, expressed as $\Delta_{1S}=(n_{1S}^2-n_{2S}^2)/2n_{1S}^2$, between the inner core layer and the cladding layer is about 0.011, and the relative index of refraction difference, expressed as $\Delta_{3S}=(n_{3S}^2-n_{2S}^2)/2n_{3S}^2$, between the outer core layer and the cladding layer is about 0.0045; and
a dispersion compensating fiber (DCF) connected with the optical fiber and having a negative dispersion slope, the dispersion slope of the DCF being matched to the dispersion slope of the optical fiber in such a manner that the DCF compensates for the accumulated dispersion in the optical fiber.

15. An optical fiber link comprising:
an optical fiber having a positive dispersion slope, the dispersion of the optical fiber varying from about 6 ps/(km.nm) to about 8 ps/(km.nm) in the wavelength range of about 1530 nm to 1565 nm; and
a dispersion compensating fiber (DCF) connected with the optical fiber and having a negative dispersion slope, the dispersion slope of the DCF being matched to the dispersion slope of the optical fiber in such a manner that the DCF compensates for the accumulated dispersion in the optical fiber.

16. An optical fiber link comprising:
an optical fiber having a positive dispersion slope; and
a dispersion compensating fiber (DCF) connected with the optical fiber and having a negative dispersion slope, the dispersion slope of the DCF being matched to the dispersion slope of the optical fiber in such a manner that the DCF compensates for the accumulated dispersion in the optical fiber, the dispersion of the DCF varying from about −220 ps/(km.nm) to about −300 ps/(km.nm) in the wavelength range of about 1530 nm to 1565 nm.

17. An optical fiber link comprising:
a dispersion compensating fiber (DCF) for connecting in optical communication to an optical fiber to compensate for accumulated dispersion in the optical fiber, the DCF including an inner core layer, an inner cladding layer positioned coaxially with and formed on the outside of the inner core layer, an outer core layer positioned coaxially with and formed on the outside of the inner cladding layer, and an outer cladding layer positioned coaxially with and formed on the outside of the outer core layer, the inner core layer having an index of refraction of $n_{1C}$, the inner cladding layer having an index of refraction of $n_{3C}$, the outer core layer having an index of refraction of $n_{4C}$, and the outer cladding layer having an index of refraction of $n_{2C}$, such that the relative index of refraction difference, expressed as $\Delta_{1C}=(n_{1C}^{2}-n_{2C}^{2})/2n_{1C}^{2}$ between the inner core layer and the outer cladding layer is about 0.02, the relative index of refraction difference, expressed as $\Delta_{3C}=(n_{3C}^{2}-n_{2C}^{2})/2n_{3C}^{2}$ between the inner cladding layer and the outer cladding layer is about –0.004, and the relative index of refraction difference, expressed as $\Delta_{2C}=(n_{4C}^{2}-n_{2C}^{2})/2n_{4C}^{2}$ between the outer core layer and the outer cladding layer is about 0.003.

18. The optical fiber link of claim 17, wherein the dispersion of the DCF varies from about –220 ps/(km.nm) to about –300 ps/(km.nm) in the wavelength range of about 1530 nm to 1565 nm.

19. The optical fiber link of claim 17, wherein the DCF has a negative dispersion slope.

20. An optical fiber link comprising:
an optical fiber having a positive dispersion slope, the optical fiber including an inner core layer, an outer core layer positioned coaxially with and formed on the outside of the inner core layer, and a cladding layer positioned coaxially with and positioned on the outside of the outer core layer; and
a dispersion compensating fiber (DCF) connected in optical communication with the optical fiber, the DCF having a negative dispersion slope, and including an inner core layer, a inner cladding layer positioned coaxially with and formed on the outside of the inner core layer, an outer core layer positioned coaxially with and formed on the outside of the inner cladding layer, and an outer cladding layer positioned coaxially with formed on the outside of the outer cladding, the dispersion slope of the DCF being matched to the dispersion slope of the optical fiber so that the DCF compensates for the accumulated dispersion in the optical fiber.

21. A method of making an optical fiber link comprising:
forming an optical fiber with a positive dispersion slope;
forming a dispersion compensating fiber (DCF) with a negative dispersion slope, including forming an inner core layer, forming an inner cladding layer coaxially about the inner core layer, forming an outer core layer about the inner cladding layer, and forming an outer cladding layer coaxially about the outer core layer; and
connecting the DCF to the optical fiber to make the optical fiber link, the dispersion slope of the DCF being matched to the dispersion slope of the optical fiber so that the DCF compensates for the accumulated dispersion in the optical fiber.

22. The method of claim 21, wherein forming the inner core layer includes forming the inner core layer with a radius of about 1.1 $\mu$m and an index of refraction of about 1.47380.

23. The method of claim 21, wherein forming the inner cladding layer includes forming the inner cladding layer with an inner radius equal to the outer radius of the inner core layer and an outer radius of about 5.33 $\mu$m, and an index of refraction of about 1.43828.

24. The method of claim 21, wherein forming the outer core layer includes forming the outer core layer with an inner radius equal to the outer radius of the inner cladding layer and an outer radius of about 7.7 $\mu$m, and an index of refraction of about 1.44838.

25. The method of claim 21, wherein forming the outer cladding layer includes forming the outer cladding layer with an inner radius equal to the outer radius of the outer core layer, and an index of refraction of about 1.44402.

26. The method of claim 21, wherein forming the inner core layer, the inner cladding layer, the outer core layer, and the outer cladding layer includes forming the respective layers from $SiO_2$.

27. The method of claim 26, wherein forming the inner core layer, and the outer core layer includes doping the inner core layer with $GeO_2$ having a mole fraction in the range of about 18.4%, and doping the outer core layer with $GeO_2$ having a mole fraction of about 2.9%, and forming the inner cladding layer includes doping the inner cladding layer with fluorine with a mole fraction of about 1.26%.

28. A method of making an optical fiber link comprising:
forming an optical fiber with a positive dispersion slope, including forming an inner core layer with a radius of about 2 $\mu$m and an index of refraction of about 1.46, forming an outer core layer coaxially about the inner core layer, and forming a cladding layer coaxially about the annular core layer;
forming a dispersion compensating fiber (DCF) with a negative dispersion slope; and
connecting the DCF to the optical fiber to make the optical fiber link, the dispersion slope of the DCF being matched to the dispersion slope of the optical fiber so that the DCF compensates for the accumulated dispersion in the optical fiber.

29. A method of making an optical fiber link comprising:
forming an optical fiber with a positive dispersion slope, including forming an inner core layer, forming an outer core layer coaxially about the inner core layer with an inner radius equal to the outer radius of the inner core layer and an outer radius of about 3.7 $\mu$m and an index of refraction of about 1.45, and forming a cladding layer coaxially about the annular core layer;
forming a dispersion compensating fiber (DCF) with a negative dispersion slope; and
connecting the DCF to the optical fiber to make the optical fiber link, the dispersion slope of the DCF being matched to the dispersion slope of the optical fiber so that the DCF compensates for the accumulated dispersion in the optical fiber.

30. A method of making an optical fiber link comprising:
forming an optical fiber with a positive dispersion slope, including forming an inner core layer, forming an outer core layer coaxially about the inner core layer, and forming a cladding layer with an inner radius equal to the outer radius of the outer core layer and an index of refraction of about 1.44 coaxially about the annular core layer;
forming a dispersion compensating fiber (DCF) with a negative dispersion slope; and
connecting the DCF to the optical fiber to make the optical fiber link, the dispersion slope of the DCF being matched to the dispersion slope of the optical fiber so that the DCF compensates for the accumulated dispersion in the optical fiber.

* * * * *

UNITED STATES PATENT AND TRADEMARK OFFICE
CERTIFICATE OF CORRECTION

PATENT NO.   : 6,650,812 B2
DATED        : November 18, 2003
INVENTOR(S)  : Ishwar Chandra Goyal et al.

It is certified that error appears in the above-identified patent and that said Letters Patent is hereby corrected as shown below:

Drawings,
Sheet 3, Fig. 4, "$n_{2S}$" should be replaced with -- $n_{3S}$ --.
Sheet 3, fig. 4, "$N_{3S}$" should be replaced with -- $n_{2S}$ --.

Column 1,
Line 41, insert -- match -- between "tailored to" and "the dispersion".

Column 2,
Line 52, delete "DE" and insert -- $D_E$ --.

Column 5,
Line 40, delete "$A_{1C}, A_{3C},$ and $A_{4C}$" and insert -- $\Delta_{1C}, \Delta_{3C},$ and $\Delta_{4C}$ --.

Column 6,
Line 27, delete "DE" and insert -- $D_E$ --.

Column 7,
Line 38, delete "refract on" and insert -- refraction --.

Column 8,
Line 25, delete "$(n_{3S}^{2-n}{}_{2S}^2)$" and insert -- $(n_{3S}^2 - n_{2S}^2)$ --.

Column 9,
Line 6, delete "$(n_{1C}^{2-n}{}_{2C}^2)$" and insert -- $(n_{1C}^2 - n_{2C}^2)$ --.
Line 9, delete "$(n_{3C}^{2-n}{}_{2C}^2)$" and insert -- $(n_{3C}^2 - n_{2C}^2)$ --.
Line 12, delete "$\Delta_{2C}$" and insert -- $\Delta_{4C}$ --.

Signed and Sealed this

Twentieth Day of April, 2004

JON W. DUDAS
*Acting Director of the United States Patent and Trademark Office*